United States Patent
Bittner

[11] Patent Number: 5,159,404
[45] Date of Patent: Oct. 27, 1992

[54] DIODE-ARRAY SPECTROMETER

[75] Inventor: Reinhold Bittner, Schwäbisch Gmünd, Fed. Rep. of Germany

[73] Assignee: Carl-Zeiss-Stiftung, Heidenheim, Fed. Rep. of Germany

[21] Appl. No.: 801,451

[22] Filed: Dec. 2, 1991

[30] Foreign Application Priority Data

Dec. 4, 1990 [DE] Fed. Rep. of Germany ....... 4038638

[51] Int. Cl.⁵ .............................. G01J 3/18; G01J 3/36
[52] U.S. Cl. .................................................... 356/328
[58] Field of Search .................... 356/326, 328; 385/37

[56] References Cited

U.S. PATENT DOCUMENTS 4,707,056 11/1987 Bittner .................................. 356/326
4,838,645 6/1989 Mächler et al. ...................... 356/328
5,026,160 6/1991 Dorain et al. ......................... 356/328

OTHER PUBLICATIONS

"Planar Rowland Spectrometer for Fiber-Optic Wavelength Demultiplexing" by H. W. Yen, Optics Letter, vol. 6, No. 12, Dec. 1981, pp. 639 to 641.

Primary Examiner—F. L. Evans
Attorney, Agent, or Firm—Walter Ottesen

[57] ABSTRACT

A transparent carrier body of a diode-array spectrometer having a concave grating is configured as a biconvex lens and the diode array is mounted at a distance (d) to a second convex surface lying opposite the concave grating. Preferably, the radii of curvature ($r_1$, $r_2$) differ from each other only slightly. A simplified manufacture and adjustment is possible with good optical correction.

7 Claims, 1 Drawing Sheet

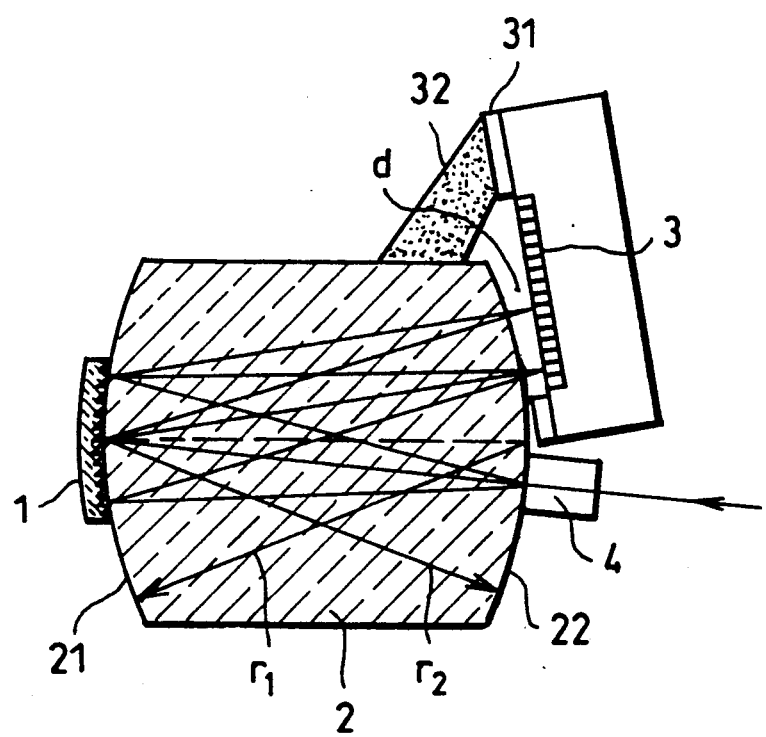

DIODE-ARRAY SPECTROMETER

FIELD OF THE INVENTION

The invention relates to a diode-array spectrometer having a concave grating and a transparent carrier.

BACKGROUND OF THE INVENTION

U.S. Pat. No. 4,707,056 discloses spectrometers and demultiplexers having mechanically divided or holographic concave gratings. The entrance slit and exit plane lie substantially on the Rowland circle. In a compact and robust embodiment, the optical components are mounted on a glass or plastic body. It is known to arrange a diode array in the exit plane in spectrometers of this kind.

However, a considerable danger of breakage exists with the required cementing of the diode array to the spectrometer. Furthermore, commercially available diode arrays are built into housings and for this reason cannot be mounted directly on the spectrometer body.

A planar Rowland spectrometer is disclosed in the paper of H. W. Yen et al entitled "Planar Rowland Spectrometer for Fiber-Optic Wavelength Demultiplexing" published in the journal "Optics Letters", Vol. 6, no. 12, December 1981, pages 639 to 641. This planar Rowland spectrometer has a base body in the form of a slab waveguide on which a cylindrical concave grating is mounted. The slab waveguide has an end face facing away from the grating which has the contour of the Rowland circle. Radially arranged light-conducting fibers operate as signal outputs.

SUMMARY OF THE INVENTION

It is an object of the invention to configure a diode-array spectrometer of the kind referred to above so that it is suitable for utilizing diode arrays which are mass produced. It is another object of the invention to configure such a diode-array spectrometer so that it is simple to assemble and adjust and so that the imaging errors, especially the coma, can be well corrected.

The above objects are achieved with a diode-array spectrometer having a concave grating and a transparent carrier.

The invention proceeds from the premise that a reliable assembly of mass produced diode arrays requires an air gap relative to the transparent carrier. In this way, the possibility for correcting tolerance variations of the carrier body is provided by displacing and tilting the diode array for adjustment.

However, the boundary surface of the carrier body to air is now an additional refracting surface because of which imaging errors and especially coma arise. The invention permits the utilization of the advantages of the air gap without the disadvantages thereof by introducing an arcuate optical surface in lieu of a planar optical surface. For manufacture, this presents no problem and in principle, a cylindrical form is adequate when the divergence of the illuminating beam entering through the entrance slit is not too great. If a lightwave guide of the kind is utilized as in the arrangement described in the article of H. W. Yen et al, then this likewise applies. A spherical form is easily suited and simpler from a manufacturing view point than a cylindrical form.

In Yen et al, the carrier follows the Rowland circle on the end face thereof facing away from the grating with the radius of the Rowland circle being half the radius of the grating and with the curvature center of the circle being at the center of the lens. In contrast to the planar Rowland spectrometer of Yen et al, both radii of curvature in the diode-array spectrometer of the invention differ only slightly from each other and each curvature center lies near the curvature apex of the other convex surface.

BRIEF DESCRIPTION OF THE DRAWING

The invention will now be described with reference to the single FIGURE of the drawing showing the diode-array spectrometer of the invention.

DESCRIPTION OF THE PREFERRED EMBODIMENTS OF THE INVENTION

The diode-array spectrometer of the invention includes a transparent carrier 2 made, for example, of glass produced under the designation UBK 7 which is commercially available from Schott Glaswerke of Germany. A concave grating 1 is mounted on the first convex surface 21 of the carrier body 2. A small air gap (d) of for example 1.8 mm is provided between the second convex surface 22 and a diode array 3 disposed in a housing 31. In the adjusted position, the diode array 3 is fixed by means of an epoxy adhesive 32 or the like to the carrier body 2.

In the embodiment shown, the carrier body 2 is a spherical lens having a center thickness of 28.26 mm, with the radius $r_1$ of the first convex surface 21 and of the grating 1 being 29.64 mm and with the radius $r_2$ of the second convex surface 22 being 28.18 mm. Thus, the radius $r_2$ of the second convex surface 22 differs only slightly from the radius $r_1$.

An entrance slit 4 having for example a width of 50 $\mu$m and a height of 2,500 $\mu$m is arranged on the second convex surface 22 next to the diode array.

The light to be analyzed spectrally can be supplied to the entrance slit 4 in any desired manner such as via a light-conducting fiber (not shown).

The electronics and the software for operating the diode array 3 and the signal evaluation is likewise not shown and is well known for desired applications of photodiode arrays.

With a grating of 366 lines per millimeter, the spectrometer of the embodiment has a dispersion which has good linearity for wavelengths of 360 to 780 nm with the dispersion being 132 nm/mm and with individual photodiodes having a width of 25 $\mu$m in the diode array 3, a resolution better than 10 nm is obtained.

The precise determination of the lens geometry of the carrier body 2, the position and magnitude of the entrance slit 4 and the position of the diode array 3 for minimizing all imaging errors and for optimally linearizing the spectrum, is obtained in the context of the invention utilizing known means of optic computation.

In lieu of a grating 1 defined primarily by the mechanical ruling of the grating, a further improvement is obtained by utilizing a grating with additional error correction by means of holographic manufacture.

In lieu of air, another medium can be provided in the gap between the carrier body 2 and the diode array 3.

It is understood that the foregoing description is that of the preferred embodiments of the invention and that various changes and modifications may be made thereto without departing from the spirit and scope of the invention as defined in the appended claims.

What is claimed is:

1. A diode-array spectrometer comprising:
   a transparent carrier body defining a biconvex lens having first and second convex surfaces;
   a concave grating mounted on said first convex surface;
   a diode array lying opposite said second convex surface; and,
   mounting means for holding said diode array so as to cause said second convex surface and said diode array to conjointly define a small spacing (d) therebetween.

2. The diode-array spectrometer of claim 1, further comprising optical means mounted on said second convex surface for defining an entrance slit through which light to be spectrally analyzed passes into said biconvex lens.

3. The diode-array spectrometer of claim 1, said first and second convex surfaces having respective radii of curvature ($r_1$, $r_2$) and said radii of curvature ($r_1$, $r_2$) differing only slightly.

4. The diode-array spectrometer of claim 3, said first and second convex surfaces defining first and second apeces and said first radius of curvature $r_1$ having a center of curvature lying in the immediate proximity of said second apex and said second radius of curvature having a center of curvature in the immediate proximity of said first apex.

5. The diode-array spectrometer of claim 1, said concave grating being holographically corrected.

6. The diode-array spectrometer of claim 1, said carrier body being spherical.

7. The diode-array spectrometer of claim 1, said carrier body being cylindrical.

* * * * *